US012058252B2

(12) United States Patent
Gu et al.

(10) Patent No.: US 12,058,252 B2
(45) Date of Patent: Aug. 6, 2024

(54) KEY SECURITY MANAGEMENT SYSTEM AND METHOD, MEDIUM, AND COMPUTER PROGRAM

(71) Applicant: Shanghai NanoJClean Technology Co., Ltd., Shanghai (CN)

(72) Inventors: Jianliang Gu, Shanghai (CN); Bangya Ma, Shanghai (CN)

(73) Assignee: Shanghai NanoJClean Technology Co., Ltd., Shanghai (CN)

(*) Notice: Subject to any disclaimer, the term of this patent is extended or adjusted under 35 U.S.C. 154(b) by 555 days.

(21) Appl. No.: 17/309,831

(22) PCT Filed: Dec. 30, 2019

(86) PCT No.: PCT/CN2019/129769
§ 371 (c)(1),
(2) Date: Jun. 22, 2021

(87) PCT Pub. No.: WO2020/135853
PCT Pub. Date: Jul. 2, 2020

(65) Prior Publication Data
US 2022/0078009 A1    Mar. 10, 2022

(30) Foreign Application Priority Data

Dec. 29, 2018    (CN) .................. 201811633995.X (51) Int. Cl.
*H04L 9/40*    (2022.01)
*H04L 9/08*    (2006.01)
(Continued)

(52) U.S. Cl.
CPC .......... *H04L 9/0877* (2013.01); *H04L 9/0825* (2013.01); *H04L 9/0869* (2013.01);
(Continued)

(58) Field of Classification Search
CPC ... H04L 9/0877; H04L 9/0825; H04L 9/0869; H04L 9/0894; H04L 9/3239; H04L 9/3263; H04L 9/50
See application file for complete search history.

(56) References Cited

U.S. PATENT DOCUMENTS 8,660,266 B2    2/2014  Sutton, II et al.
9,311,500 B2    4/2016  Roth et al.
(Continued)

FOREIGN PATENT DOCUMENTS

CN    1801029 A    7/2006
CN    1925401 A    3/2007
(Continued)

OTHER PUBLICATIONS

Fan, Chun-I et al., "Secure Hierarchical Bitcoin Wallet Scheme Against Privilege Escalation Attacks." 2018 IEEE Conference on Dependable and Secure Computing (DSC), IEEE, Dec. 10, 2018, pp. 1-8.
(Continued)

*Primary Examiner* — Thaddeus J Plecha
(74) *Attorney, Agent, or Firm* — Downs Rachlin Martin PLLC (57) ABSTRACT

The present application discloses a key security management system and a key security management method, a computer-readable storage medium, and a computer program. The key security management system includes a security host and a hardware security device. The security host is configured to receive a first operation request, verify the first operation request, and generate a second operation request based on the first operation request when the verification is passed, wherein the first operation request and the second operation request both include an identification. The hardware security device is configured to receive the second operation request from the security host, verify the second
(Continued)

operation request, parse the second operation request to obtain a type of the second operation request when the verification is passed, and perform an operation related to a key pair associated with the identification based on the type of the second operation request, wherein the key pair includes a public key and a private key specific to the identification.

21 Claims, 5 Drawing Sheets

(51) Int. Cl.
  *H04L 9/32* (2006.01)
  *H04L 9/00* (2022.01)
(52) U.S. Cl.
  CPC .......... *H04L 9/0894* (2013.01); *H04L 9/3239* (2013.01); *H04L 9/3263* (2013.01); *H04L 9/50* (2022.05)

(56) References Cited

U.S. PATENT DOCUMENTS

| | | | | |
|---|---|---|---|---|
| 11,012,237 | B1* | 5/2021 | Sarda | H04L 9/0861 |
| 2002/0111913 | A1* | 8/2002 | Tallent | G06Q 20/40 |
| | | | | 705/53 |
| 2005/0114686 | A1 | 5/2005 | Ball et al. | |
| 2014/0123233 | A1* | 5/2014 | Wu | H04L 63/107 |
| | | | | 726/4 |
| 2016/0344559 | A1* | 11/2016 | Ma | H04W 12/069 |
| 2017/0223015 | A1 | 8/2017 | Lee et al. | |
| 2018/0097638 | A1 | 4/2018 | Haldenby et al. | |
| 2018/0262341 | A1 | 9/2018 | Cheng et al. | |
| 2019/0036710 | A1 | 1/2019 | Qiu | |

FOREIGN PATENT DOCUMENTS

| | | | |
|---|---|---|---|
| CN | 10135991 | A | 2/2009 |
| CN | 101426190 | A | 5/2009 |
| CN | 101459505 | A | 6/2009 |
| CN | 101557289 | A | 10/2009 |
| CN | 102215488 | A | 10/2011 |
| CN | 103580872 | A | 2/2014 |
| CN | 105373955 | A | 3/2016 |
| CN | 105915338 | A | 8/2016 |
| CN | 106161017 | A | 11/2016 |
| CN | 106921496 | A | 7/2017 |
| CN | 107395349 | A | 11/2017 |
| CN | 108830711 | A | 11/2018 |
| CN | 108847937 | A | 11/2018 |
| CN | 109064151 | A | 12/2018 |
| CN | 109067801 | A | 12/2018 |
| CN | 109687959 | A | 4/2019 |
| CN | 106686004 | B | 7/2019 |
| WO | 2003017559 | A2 | 2/2003 |

OTHER PUBLICATIONS

Craig Gentry et al., "Hierarchical ID-Based Cryptography." Electronic Publishing, Artistic Imaging, and Digital Typography, Computer Science, vol. 2501, pp. 1-21, Jan. 1, 2002.
Gutoski et al., "Heirarchical Deterministic Bitcoin Wallets That Tolerate Key Leakage". Perimeter Institute For Theoretical Physics, Wateroo, Canada (Published in Financial Cryptography 2014).
Khacef et al., "Secure Peer-to-Peer Communication Based on Blockchain". Sorbonne University (Mar. 15, 2019).
https://wiki.trezor.io/index.php?title=Address_path_(BIP32)&oldid=57015. Address path (BIP32) (Last viewed on Jun. 11, 2021).
Skalkotos, "Ledger Vault: NYC Office Brings Crypto Security to Institutional Investors." Nov. 26, 2018.
Blog Posts: Ledger opens Ledger Vault early access program, providing unprecedented digital asset security to Institutional investors. https://www.ledger.com/ledger-opens-ledger-vault-early-access-program (May 15, 2018 ).
Press Release: Ledger announces the launch of Ledger Vault, a cryptocurrency security solution for enterprises and hedge funds, and adds ex-NYSE's Jean-Michel Pailhon as VP Finance & Strategy to supervise custodian services for crypto assets. https://www.ledger.com/ledger-announces-the-vault-and-adds-ex-nyses-jean-michel-pailhon-as-vp-finance-strategy (May 23, 2017).

* cited by examiner

KEY SECURITY MANAGEMENT SYSTEM AND METHOD, MEDIUM, AND COMPUTER PROGRAM

TECHNICAL FIELD

The present application relates to the field of key management, and in particular, to a key security management system and a key security management method, a non-volatile storage medium, and a computer program.

BACKGROUND

With the rapid development of e-commerce, the problem of transaction security has received increasing attention. The transaction process involves processes of encrypting, decrypting, and signing data using keys. Therefore, the security level of key management determines the security level of the transaction process. Key management usually includes key generation, use, destruction, and so on.

Existing encryption algorithms may fall into two categories: symmetric encryption algorithms and asymmetric encryption algorithms. In a symmetric encryption system, data encryption and decryption use the same key. However, in an asymmetric encryption system, data encryption and decryption use two different keys. The two keys are mutually dependent on each other, form a key pair, and are respectively called a public key and a private key. The public key may be available to the public and may be sent through a secure or non-secure channel, while the private key is non-public and known to nobody except the holder. It is assumed that a user A has a key pair including a public key $P_k$ and a private key $S_k$ of the user. The user A sends the public key $P_k$ thereof to another user B. If the user B wants to transmit data to the user A, the user B may encrypt the data using the public key $P_k$ of the user A and transmit the data to the user A. After receiving the encrypted data, the user A decrypts the encrypted data using the private key $S_k$ thereof to recover the data (plaintext) that the user B wants to transmit to him. On the other hand, if the user A wants to transmit data to the user B, the user A may sign the data using his own private key $S_k$ and transmit the signed data to the user B. After the user B receives the signed data, if the signed data can be decrypted using the public key $P_k$ of the user A, it can be verified that the data is sent by the user A. Thus, data is signed using a private key so that a receiver can verify the identity of a sender. Because of such characteristic of the private key, extremely high requirements exist for security of private key management.

In the conventional financial industry, a private key of a user is usually stored in special hardware, for example, a storage device such as a USB flash drive or an IC card. In use, the hardware needs to be connected to a computer, and the computer retrieves the private key from the storage device to perform an encryption operation. However, certain security risks exist in this process.

On the other hand, as part of enterprise assets, digital assets currently also need to be connected to an asset management system of an enterprise like traditional assets. Due to the essential difference between digital assets and ordinary assets that one private key corresponds to one digital asset address, the management of digital assets is almost entirely dependent on the management of a private key dedicated to digital assets, so that the enterprise needs a solution for private key storage. In normal commercial activities of the enterprise, considering the needs for organizational structure and asset management of the enterprise, different sub-organizations, departments, or employees, or other users (collectively referred to as enterprise users) need separate digital asset accounts, and thus a plurality of private keys are certainly needed to correspond to different digital asset accounts. A traditional private key system does not have correlation, meaning that each user of the enterprise needs to separately manage his own account, which inadequately matches the asset management system of the enterprise.

SUMMARY OF THE INVENTION

The present disclosure provides a key security management scheme for digital asset management of enterprise users, where operations such as user key generation and use are performed in a hardware security device so that a private key of a user does not leave the hardware security device, thereby ensuring high security of the private key of the user.

One aspect of the present disclosure provides a key security management system. The key security management system includes: a security host, configured to receive a first operation request, verify the first operation request, and generate a second operation request based on the first operation request when the verification is passed, wherein the first operation request and the second operation request both include an identification; and a hardware security device, configured to receive the second operation request from the security host, verify the second operation request, parse the second operation request to obtain a type of the second operation request when the verification is passed, and perform an operation related to a key pair associated with the identification based on the type of the second operation request, wherein the key pair includes a public key and a private key specific to the identification.

Another aspect of the present disclosure provides a key security management method. The method includes: receiving a first operation request by a security host; verifying the first operation request by the security host, and generating a second operation request based on the first operation request when the verification is passed, wherein the first operation request and the second operation request both include an identification; receiving the second operation request from the security host by the hardware security device, verifying the second operation request, and parsing the second operation request to obtain a type of the second operation request when the verification is passed; and performing an operation related to a key pair associated with the identification based on the type of the second operation request by the hardware security device, wherein the key pair includes a public key and a private key specific to the identification.

A further aspect of the present disclosure provides a non-volatile computer-readable storage medium having machine-executable instructions stored thereon, wherein the machine-executable instructions, when executed by a computer, perform the key security management method described above.

A still further aspect of the present disclosure provides a computer program including machine-executable instructions that, when executed, perform the key security management method described above.

The foregoing is a summary of the present application where simplification, generalization, and omission of details may exist. Therefore, it should be appreciated by those skilled in the art that this section is for exemplary illustration only, and not intended to limit the scope of the present application by any means. This summary section is not intended to identify key features or essential features of the claimed subject matter, and is not intended to be used as a supplementary means to identify the scope of the claimed subject matter.

BRIEF DESCRIPTION OF THE DRAWINGS

The aforementioned and other features of the present application will be more fully and clearly understood through the following description and the appended claims in combination with the accompanying drawings. It can be understood that these accompanying drawings merely describe several embodiments of the present application and thus should not be considered as limitation to the scope of the present application. The present application will be described with more clarity and in more detail with reference to the accompanying drawings.

DETAILED DESCRIPTION OF THE INVENTION

The following detailed description is made with reference to the accompanying drawings constituting a part of the description. Unless otherwise specified in the context, similar symbols usually represent similar components in the accompanying drawings. The illustrative embodiments described in the detailed description, the accompanying drawings, and the claims are not intended to be limiting. Other embodiments may be adopted, and other modifications may be made without departing from the spirit or scope of the subject matter of the present application. It can be understood that various aspects of the present application generally described in the present application and graphically presented in the accompanying drawings may be arranged, replaced, combined, and designed in many different configurations, and these different configurations explicitly constitute a part of the present application.

Figure 1:
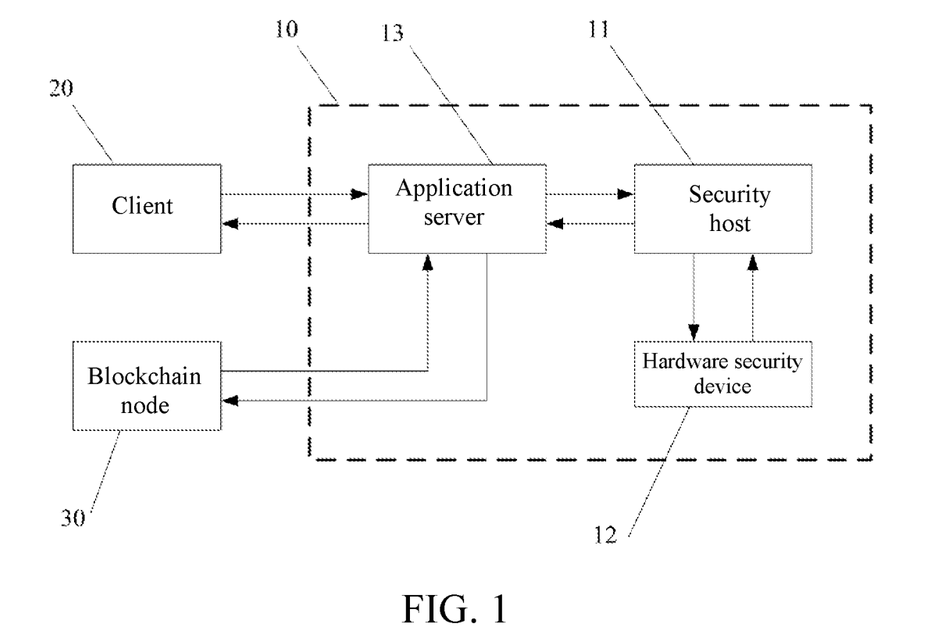
FIG. 1 is a schematic diagram of a key security management system according to the present disclosure.

FIG. 1 is a schematic diagram of a key security management system 10 according to the present disclosure. As shown in FIG. 1, the key security management system 10 includes a security host 11 and a hardware security device 12. The security host 11 may be any type of computer. The hardware security device 12 may be a Hardware Security Module (HSM) or any other internationally certified hardware security device meeting predetermined security certification standards, for example, the Common Criteria for Information Technology Security Evaluation (Common Criteria) or the United States Federal Information Processing Standard (FIPS) 140-2, and includes a memory (not shown) and a processor (not shown). The hardware security device 12 can generate, according to various asymmetric cryptographic algorithms, a key pair dedicated to digital asset management and including a public key and a private key. These asymmetric cryptographic algorithms are well known in the art and will not be described herein again.

The security host 11 is configured to receive a first operation request, verify the first operation request, and generate a second operation request based on the first operation request when the verification is passed, where the first operation request and the second operation request both include an identification. The identification may be an identification of a user and/or an identification of an organization associated with the user. The "user" and "organization" in the present disclosure refer to different subjects having a subordination relationship, where the "user" belongs to the "organization" associated therewith. For example, the "organization" may be an enterprise, and the "user" may be an employee, a sub-organization, or a department of the enterprise or any other user or customer of the enterprise. Each subject has a unique identification.

The hardware security device 12 is configured to receive the second operation request from the security host 11, verify the second operation request, parse the second operation request to obtain a type of the second operation request when the verification is passed, and perform an operation related to a key pair associated with the identification based on the type of the second operation request. The key pair includes a public key and a private key specific to the identification. In some implementations, the hardware security device 12 can derive a key pair of an organization and a key pair of a user based on a Hierarchical Deterministic Wallet rule (called a hierarchical deterministic rule for short) jointly defined in Bitcoin improvement proposals BIP32, BIP39, and BIP44.

BIP32 stipulates a method of generating a key pair series of a hierarchical tree structure from a random seed; BIP39 stipulates a method of deriving a random seed from a mnemonic sentence; BIP44 further gives special meaning to various layers in a hierarchical tree structure. Reference may be made to the corresponding Bitcoin improvement protocols for more specific description of BIP32, BIP39, and BIP44. According to the hierarchical deterministic rule, first, a mnemonic sentence is converted into a random seed through a function PBKDF2; then, a hash operation is performed on the random seed to generate a master root key pair corresponding to a root node; then, sub-node key pairs corresponding to sub-nodes of the root node are derived based on the master root key pair; further, key pairs of sub-nodes of each sub-node are derived based on the key pair of the sub-node; and so on. The root node can derive several sub-nodes, and each sub-node can derive several sub-nodes, so that an infinite number of key pairs at different levels can be derived based on one random seed. Different paths exist from the root node to each sub-node of the tree structure, each path corresponds to one sub-node in a one-to-one manner, and therefore, a key pair of a sub-node corresponding to a path of the sub-node can be determined according to the key pair of the root node and the path. If the root node corresponds to an organization (for example, a corporation), and the sub-node corresponds to a user of the organization (for example, a department or a member of the corporation), the master root key pair corresponding to the root node may be used as a master root key pair of the organization, and the key pair corresponding to the sub-node may be used as a key pair of the user.

In some embodiments, the key security system 10 further includes an application server 13. The application server 13 may be located in the same network as the security host 11, or may be located in a different network and connected to the security host 11 via, for example, a network bridge. The application server 13 is configured to receive an access request of an external node, for example, a client 20 or a blockchain node 30, generate at least one first operation request according to the access request, and send the first operation request to the security host 11. On the other hand, after the security host 11 and the hardware security device 12 perform corresponding operations according to the first operation request, the application server 13 may further receive a result of the operation from the security host 11 and return the result to the external node.

The security host 11 and the hardware security device 12 are located in the same security network domain, so that the application server 13 or any other external component can access the hardware security device 12 only through the security host 11 (that is, the security host 11 serves as a gateway through which the hardware security device 12 is accessed). For example, this may be implemented by providing a firewall at the security host 11 and providing a secure link between the security host 11 and the hardware security device 12.

The specific functions and operations of the security host 11 and the hardware security device 12 may be further described with reference to FIG. 2 to FIG. 5.

Figure 2:
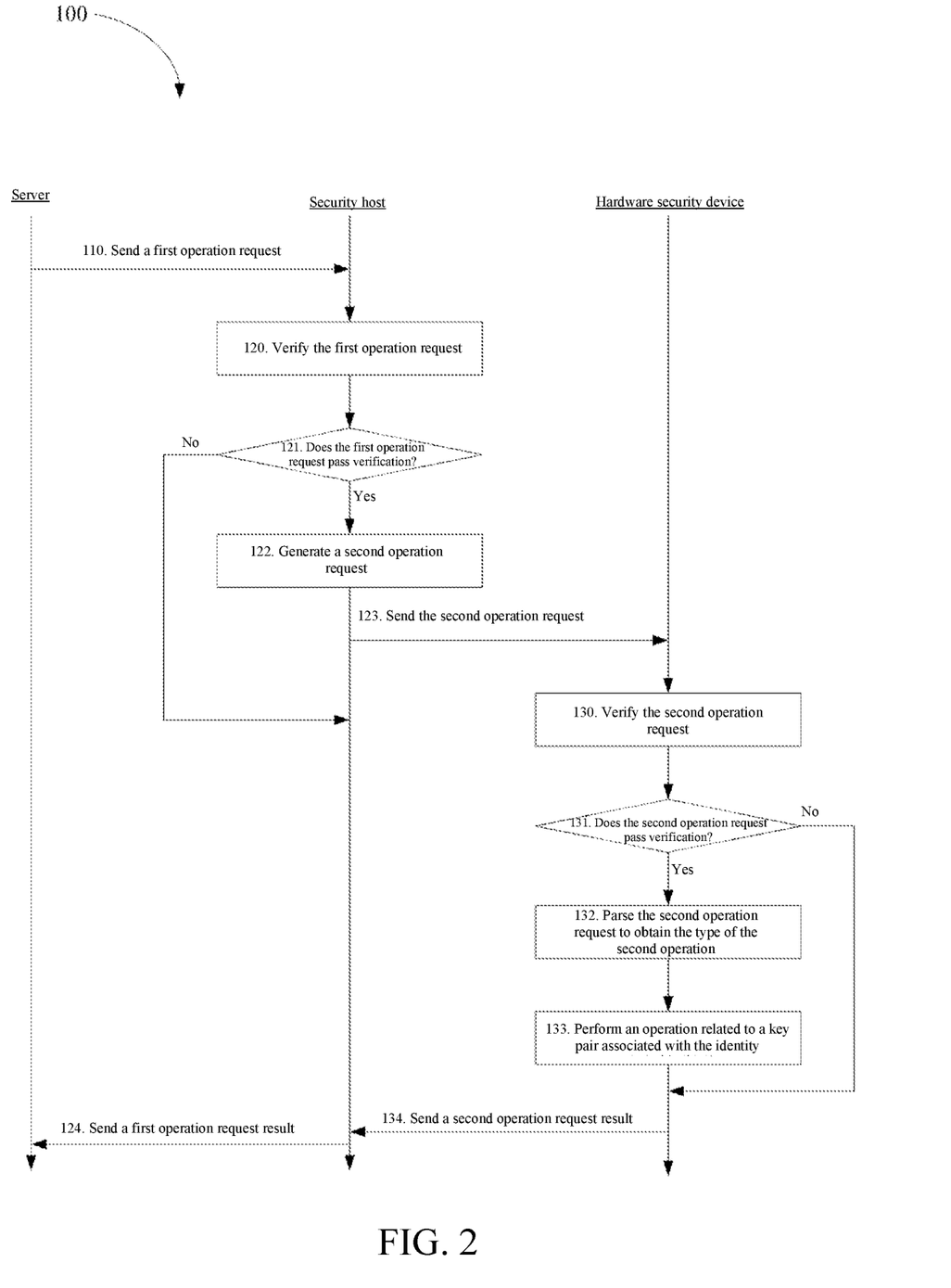
FIG. 2 is a flowchart of a key security management method according to the present disclosure.

FIG. 2 is a schematic diagram of a key security management method 100 according to the present disclosure. Various steps of the method 100 may be respectively performed by the corresponding entities shown in FIG. 1. The method 100 is described in detail below separately with reference to FIG. 1 and FIG. 2.

The security host 11 is configured to receive a first operation request (step 110). The first operation request is signed by a sender (for example, the application server 13 shown in FIG. 1) of the request, and includes at least one identification depending on a service type of the request. The first operation request, for example, may be various operation requests for digital assets, such as an account transfer request, or may be various operation requests irrelevant to digital assets, such as smart contract deployment or smart contract calling. In addition, if the digital assets are broadly understood as further including digital possessions (for example, digital documents or digital art works) except crypto-currencies, the first operation request may also be a transfer or deposit request for the digital possessions.

Further, the security host 11 is configured to verify the first operation request (step 120). The verification in step 120 may include verifying the validity of a certificate and the validity of a signature of the sender (for example, the application server 13) of the first operation request. Specifically, the security host 11 parses the first operation request to acquire an application server certificate and an application server signature included therein. The application server certificate includes an identification of the application server 13, a list of allowed service types of the application server 13, and a validity period of the application server certificate. The security host 11 decrypts the application server signature using a public key of the application server 13, so as to acquire a service type requested by the first operation request. The security host 11 compares the service type requested by the first operation request with the list of allowed service types included in the application server certificate to determine whether the service type requested by the first operation request is allowed. The security host 11 may further be configured to verify whether the application server certificate is within the validity period thereof. In addition, in some implementations, the security host 11 may further be configured to acquire a state of the application server certificate from a blockchain to verify whether the state thereof is valid. If the determination results are all Yes, it is decided in step 121 that the first operation request passes the verification.

If the first operation request passes the verification (the determination result in step 121 is "Yes"), the security host 11 generates a second operation request based on the first operation request (step 122) and sends the second operation request to the hardware security device 12 (step 123).

The second operation request includes at least a type field and a data field. The type field may be encoded with a predefined binary sequence, where different binary sequences represent different types. The type of the second operation request can be determined by decoding the type field. The data field may include an identification, for example, an identification of an organization, or may include two identifications, for example, an identification of an organization and an identification of a user associated with the organization.

The second operation request is signed by the security host 11 using a private key thereof. The hardware security device 12 is configured to verify the second operation request (step 130) after receiving the second operation request. The verification in step 130 may include verifying the validity of a certificate and the validity of a signature of the security host 11. Specifically, the hardware security device 12 is configured to parse the second operation request to acquire a security host certificate and a security host signature included therein. The security host certificate includes an identification of the security host 11, a list of allowed service types of the security host 11, and a validity period of the security host certificate. The hardware security device 12 decrypts the security host signature using a public key of the security host 11 to determine whether the second operation request is signed by the security host 11. The hardware security device 12 may further be configured to verify whether the security host certificate is within the validity period thereof. If the determination results are both Yes, it is decided in step 131 that the second operation request passes the verification.

The hardware security device 12 is further configured to, after the second operation request passes the verification (the determination result in step 131 is "Yes"), parse the second operation request to obtain the type of the second operation request (step 132), and perform an operation related to a key pair associated with the identification based on the type of the second operation request (step 133). Here, the "operation related to a key pair associated with the identification" may refer to any operation performed by the hardware security device 12 and related to a key pair associated with the identification included in the request. If the second operation request does not pass the verification, or the verification is passed and the operation is performed, the hardware security device 12 sends a second operation request result to the security host 11 to indicate request failure or return a response to the request (step 134). Accordingly, the request result is further sent by the security host 11 to the application server 13 (if any) (step 124), and the result is then sent to an external node (for example, a client 20 or a blockchain node 30) (not shown) issuing the request.

Figure 3:
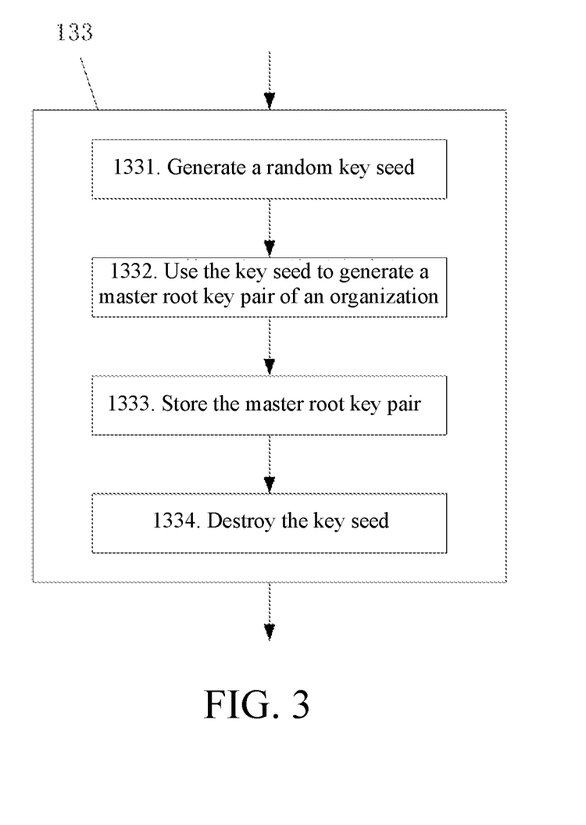
FIG. 3 is a flowchart of an operation example of a hardware security device in the key security management system shown in FIG. 1.

FIG. 3 is a flowchart of an operation example of the hardware security device 12 in the key security management system 10 shown in FIG. 1. In the example shown in FIG. 3, a parsing result of the second operation request in step 132 indicates that the type of the second operation request is generating a master root key pair of an organization, and the data field of the second operation request includes an identification of the organization. Therefore, when performing the operation related to the key pair associated with the identification based on the type of the second operation request (step 133), the hardware security device 12 is further configured to, in response to that the type of the second operation request is a request for generating a master root key pair of an organization, first generate a random key seed (step 1331), then use the key seed to generate the master root key pair of the organization (step 1332), and store the master root key pair in the memory thereof (step 1333). Further, in order to prevent the key seed from being illegally acquired by others, the hardware security device 12 is further configured to destroy the key seed (step 1334) after generating the master root key pair of the organization.

In this case, the second operation request result in step 134 may include an indication that the master root key of the organization is successfully generated.

Figure 4:
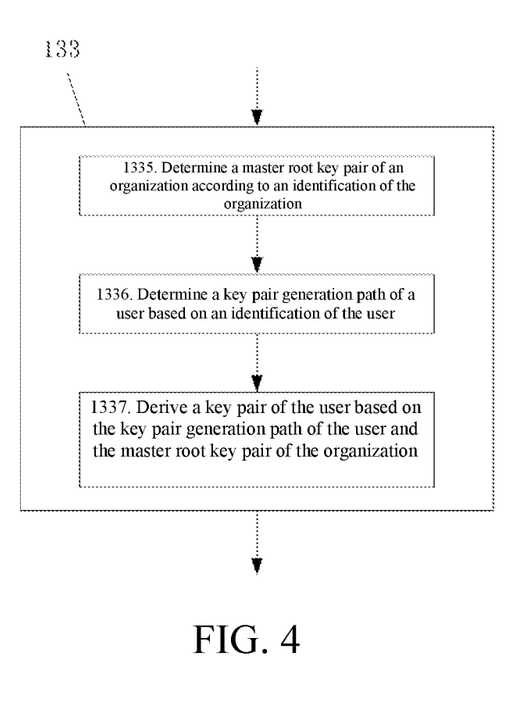
FIG. 4 is a flowchart of another operation example of the hardware security device in the key security management system shown in FIG. 1.

FIG. 4 is a flowchart of another operation example of the hardware security device 12 in the key security management system 10 shown in FIG. 1. In the example shown in FIG. 4, a parsing result of the second operation request in step 132 indicates that the type of the second operation request is acquiring a public pair of a user, and the data field of the second operation request includes an identification of an organization and an identification of the user. Moreover, the hardware security device 12 stores a master root key pair of the organization. Therefore, when performing the operation related to the key pair associated with the identification based on the type of the second operation request (step 133), the hardware security device 12 is further configured to, in response to that the type of the second operation request is a request for acquiring a public key of a user, determine the master root key pair of the organization according to the identification of the organization (step 1335), determine a key pair generation path of the user based on the identification of the user (step 1336), and derive a key pair of the user based on the key pair generation path of the user and the master root key pair of the organization (step 1337).

In this case, the second operation request result in step 134 includes the public key in the key pair of the user. The system may predefine a mapping relationship between identifications and paths of sub-nodes (each user corresponds to one sub-node) derived according to a hierarchical deterministic rule, so as to determine a key pair generation path of a user based on an identification of the user. Preferably, a hash operation may be performed on a combination of the identification of the user and the identification of the organization to obtain a hash value, and then the key pair generation path of the user may be determined based on the hash value and the hierarchical deterministic rule.

Figure 5:
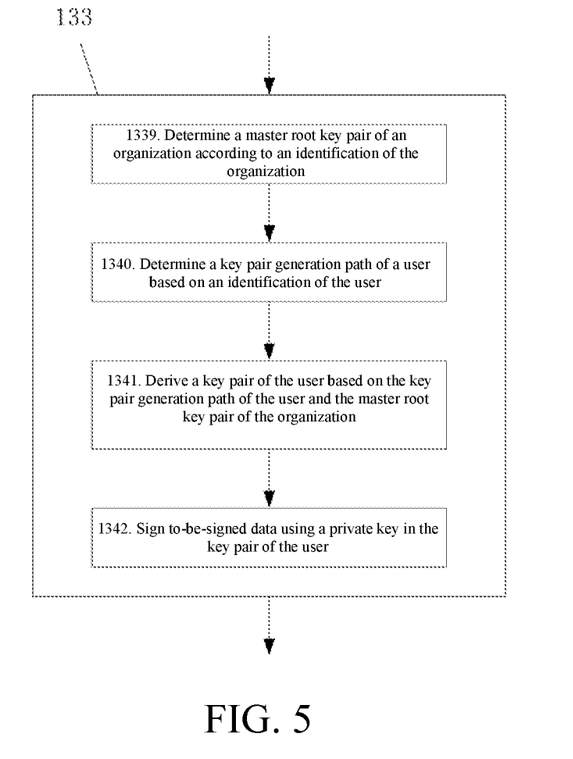
FIG. 5 is a flowchart of a further operation example of the hardware security device in the key security management system shown in FIG. 1.

FIG. 5 is a flowchart of a further operation example of the hardware security device 12 in the key security management system 10 shown in FIG. 1. In the example shown in FIG. 5, a parsing result of the second operation request in step 132 indicates that the type of the second operation request is signing to-be-signed data, and the data field of the second operation request includes an identification of an organization, an identification of the user, and the to-be-signed data. Moreover, the hardware security device 12 stores a master root key pair of the organization. Therefore, when performing the operation related to the key pair associated with the identification based on the type of the second operation request (step 133), the hardware security device 12 is further configured to, in response to that the type of the second operation request is a request for signing to-be-signed data, determine the master root key pair of the organization according to the identification of the organization (step 1339), determine a key pair generation path of the user based on the identification of the user (step 1340), derive a key pair of the user based on the key pair generation path of the user and the master root key pair of the organization (step 1341), and sign the to-be-signed data using a private key in the key pair of the user to obtain signed data (step 1342). In order to prevent the private key of the user from being illegally acquired by others, the hardware security device 12 is further configured to destroy the private key of the user after signing (not shown).

In this case, the second operation request result in step 134 includes the signed data.

Step 1336 and/or 1340 may further specifically include: performing a hash operation on a combination of the identification of the user and the identification of the organization to obtain a hash value, and determining the key pair generation path of the user based on the hash value and the hierarchical deterministic rule.

Here, the operation examples in FIG. 4 and FIG. 5 are presented by using the hardware security device 12 pre-storing a master root key pair of an organization as an example. However, those skilled in the art should understand that the present disclosure is not limited to this. The hardware security device 12 may not pre-store a master root key pair of an organization, but perform the method procedure shown in FIG. 3 each time a public key or signature of a user is requested, so as to generate the master root key pair of the organization to serve as the basis for deriving the public key or private key of the user.

In addition, the case that a master root key pair specific to an organization is directly generated for the organization is described in the example in FIG. 3. However, the present disclosure is not limited to this. In some cases, for example, in the case that the key security management system 10 manages a plurality of organizations and key pairs of respective users through a single hardware security device 12, a root key pair specific to the hardware security device 12 may be generated with reference to the method shown in FIG. 3, and master root key pairs of the organizations may be derived according to the root key pair and the relationship between the organizations managed by the hardware security device 12 (similar to the manner of deriving the key pair of the user in the examples shown in FIG. 4 and FIG. 5). In this case, the key security device 12 may store only the root key pair specific to the key security device 12 rather than a key pair of any organization or user thereof.

In addition, the term "certificate" used herein is just a wording by means of a term in conventional techniques, not necessarily meaning that the "certificate" has completely the same connotation and extension as those in the conventional techniques, nor meaning that the "certificate" is definitely issued by certificate authorities said in the conventional techniques.

It can be seen according to the method 100 of the present disclosure that in the present disclosure, double authentication is performed on an operation request by the host 11 and the hardware security device 12, thereby effectively preventing unauthorized access. Meanwhile, in the present disclosure, operations such as key generation and use are performed inside the hardware security device 12 by utilizing the characteristic that the hardware security device 12 has high security. The private key of the user is immediately destroyed after use, so that the private key of the user does not leave the hardware security device 12 in any case, that is, no device can acquire the private key of the user. In addition, only an authorized device can obtain a private key signature of the user, thereby ensuring high security of the private key of the user. Moreover, since a method of determining a key of a user based on a hierarchical deterministic rule is used in the present disclosure, in the case that different sub-organizations, departments or employees in an enterprise or users or customers of the enterprise all need separate digital asset accounts, private keys of the separate digital asset accounts can be conveniently managed without saving the private keys by themselves, thereby greatly improving the security of digital asset management.

In one or a plurality of exemplary embodiments, a non-volatile computer-readable storage medium including machine-executable instructions is further provided, where the instructions can be executed by a computer to perform the key security management method 100 in the present disclosure.

In one or a plurality of exemplary designs, hardware, software, or firmware, or any combination thereof may be used to implement the function in the present disclosure. For example, if implemented by software or firmware, the function may be stored as one or more instructions or codes on a computer-readable storage medium, or transmitted as one or more instructions or codes on a computer-readable storage medium.

Various constituents of the system disclosed herein may be implemented using discrete hardware components, or may be integrally implemented in one hardware component. For example, various exemplary constituents described with reference to the present disclosure may be implemented or executed by general-purpose processors, digital signal processors (DSPs), application specific integrated circuits (ASICs), field programmable gate arrays (FPGAs) or other programmable logic devices, discrete gates or transistor logic, or discrete hardware components, or any combination thereof.

Other variations to the disclosed embodiments can be understood and implemented by those of ordinary skill in the art through reading the specification, the disclosed content, the accompanying drawings, and the appended claims. In the claims, the word "comprise" does not exclude other elements or steps, and the word "a" or "an" does not exclude plurality. In practical application of the present application, one component may perform functions of a plurality of technical features cited in the claims. Any reference signs in the claims should not be construed as limiting the scope.

The invention claimed is:

1. A key security management system, comprising:
   a security host, configured to receive a first operation request, verify the first operation request, and generate a second operation request based on the first operation request when the verification is passed, wherein the first operation request and the second operation request both comprise an identification; and
   a hardware security device, configured to receive the second operation request from the security host, verify the second operation request, parse the second operation request to obtain a type of the second operation request when the verification is passed, and perform an operation related to a key pair associated with the identification based on the type of the second operation request, wherein the key pair comprises a public key and a private key specific to the identification.

2. The key security management system according to claim 1, wherein the identification comprises an identification of an organization,
   wherein performing an operation related to a key pair associated with the identification based on the type of the second operation request comprises:
   in response to that the type of the second operation request is a request for generating a master root key pair of the organization, generating a random key seed and using the key seed to generate the master root key pair of the organization.

3. The key security management system according to claim 2, wherein after using the key seed to generate the master root key pair of the organization, the hardware security device is further configured to:
   store the master root key pair of the organization; and
   destroy the key seed.

4. The key security management system according to claim 1, wherein the identification comprises an identification of a user and an identification of an organization associated with the user, and the key security management system stores a master root key pair of the organization,
   wherein performing an operation related to a key pair associated with the identification based on the type of the second operation request comprises:
   in response to that the type of the second operation request is a request for acquiring a public key of the user, determining the master root key pair of the organization according to the identification of the organization;
   determining a key pair generation path of the user based on the identification of the user and a hierarchical deterministic rule;
   deriving a key pair of the user based on the key pair generation path of the user and the master root key pair of the organization; and
   sending the public key in the key pair of the user to the security host.

5. The key security management system according to claim 1, wherein the identification comprises an identification of a user and an identification of an organization associated with the user, the hardware security device stores a master root key pair of the organization, and the second operation request further comprises to-be-signed data of the user,
   wherein performing an operation related to a key pair associated with the identification based on the type of the second operation request comprises:
   in response to that the type of the second operation request is a request for signing the to-be-signed data, determining the master root key pair of the organization according to the identification of the organization;
   determining a key pair generation path of the user based on the identification of the user and a hierarchical deterministic rule;
   deriving a key pair of the user based on the key pair generation path of the user and the master root key pair of the organization;
   signing the to-be-signed data using a private key in the key pair of the user to obtain signed data; and
   sending the signed data to the security host.

6. The key security management system according to claim 4, wherein determining a key pair generation path of the user based on the identification of the user comprises:
   performing a hash operation on a combination of the identification of the user and the identification of the organization to obtain a hash value; and
   determining the key pair generation path of the user based on the hash value and the hierarchical deterministic rule.

7. The key security management system according to claim 5, wherein after signing the to-be-signed data using the private key in the key pair of the user, the hardware security device is further configured to:
destroy the private key in the key pair of the user.

8. The key security management system according to claim 1, wherein the key security management system further comprises:
an application server, configured to generate the first operation request according to a request of an external node, and send the first operation request to the security host,
wherein the hardware security device is located in the same security network domain as the security host, so that the security host serves as a gateway through which the application server accesses the hardware security device.

9. The key security management system according to claim 1, wherein verifying the first operation request comprises:
parsing the first operation request to acquire an application server certificate and an application server signature comprised therein, wherein the application server certificate comprises an identification of an application server, a list of allowed service types of the application server, and a validity period of the application server certificate;
decrypting the application server signature using a public key of the application server, so as to acquire a service type requested by the first operation request;
comparing the service type requested by the first operation request with the list of allowed service types comprised in the application server certificate to determine whether the service type requested by the first operation request is allowed;
verifying whether the application server certificate is within the validity period of the application server certificate; and
acquiring a state of the application server certificate from a blockchain to verify the state of the application server certificate.

10. The key security management system according to claim 1, wherein verifying the second operation request comprises:
parsing the second operation request to acquire a security host certificate and a security host signature comprised therein, wherein the security host certificate comprises an identification of the security host, a list of allowed service types of the security host, and a validity period of the security host certificate;
decrypting the security host signature using a public key of the security host to determine whether the second operation request is signed by the security host; and
verifying whether the security host certificate is within the validity period of the security host certificate.

11. A key security management method, comprising:
receiving, by a security host, a first operation request;
verifying, by the security host, the first operation request, and generating, by the security host, a second operation request based on the first operation request when the verification is passed, wherein the first operation request and the second operation request both comprise an identification;
receiving, by a hardware security device, the second operation request from the security host, verifying, by the hardware security device, the second operation request, and parsing, by the hardware security device, the second operation request to obtain a type of the second operation request when the verification is passed; and
performing, by the hardware security device, an operation related to a key pair associated with the identification based on the type of the second operation request, wherein the key pair comprises a public key and a private key specific to the identification.

12. The method according to claim 11, wherein the identification comprises an identification of an organization,
wherein performing an operation related to a key pair associated with the identification based on the type of the second operation request comprises:
in response to that the type of the second operation request is a request for generating a master root key pair of the organization, generating a random key seed and using the key seed to generate the master root key pair of the organization.

13. The method according to claim 12, wherein after using the key seed to generate the master root key pair of the organization, the method further comprises:
storing the master root key pair of the organization; and
destroying the key seed.

14. The method according to claim 11, wherein the identification comprises an identification of a user and an identification of an organization associated with the user, and the hardware security device stores a master root key pair of the organization,
wherein performing an operation related to a key pair associated with the identification based on the type of the second operation request comprises:
in response to that the type of the second operation request is a request for acquiring a public key of the user, determining the master root key pair of the organization according to the identification of the organization;
determining a key pair generation path of the user based on the identification of the user and a hierarchical deterministic rule;
deriving a key pair of the user based on the key pair generation path of the user and the master root key pair of the organization; and
sending the public key in the key pair of the user to the security host.

15. The method according to claim 11, wherein the identification comprises an identification of a user and an identification of an organization associated with the user, the hardware security device stores a master root key pair of the organization, and the second operation request further comprises to-be-signed data of the user,
wherein performing an operation related to a key pair associated with the identification based on the type of the second operation request comprises:
in response to that the type of the second operation request is a request for signing the to-be-signed data, determining the master root key pair of the organization according to the identification of the organization;
determining a key pair generation path of the user based on the identification of the user and a hierarchical deterministic rule;
deriving a key pair of the user based on the key pair generation path of the user and the master root key pair of the organization;
signing the to-be-signed data using a private key in the key pair of the user to obtain signed data; and
sending the signed data to the security host.

16. The method according to claim 14, wherein determining a key pair generation path of the user based on the identification of the user comprises:
- performing a hash operation on a combination of the identification of the user and the identification of the organization to obtain a hash value; and
- determining the key pair generation path of the user based on the hash value and the hierarchical deterministic rule.

17. The method according to claim 15, wherein after signing the to-be-signed data using the private key in the key pair of the user, the method comprises:
- destroying the private key in the key pair of the user.

18. The method according to claim 11, wherein receiving a first operation request comprises:
- receiving, by the security host, the first operation request from an application server, wherein the hardware security device is located in the same security network domain as the security host, so that the security host serves as a gateway through which the application server accesses the hardware security device.

19. The method according to claim 11, wherein verifying the first operation request comprises:
- parsing the first operation request to acquire an application server certificate and an application server signature comprised therein, wherein the application server certificate comprises an identification of the application server, a list of allowed service types of the application server, and a validity period of the application server certificate;
- decrypting the application server signature using a public key of the application server, so as to acquire a service type requested by the first operation request;
- comparing the service type requested by the first operation request with the list of allowed service types comprised in the application server certificate to determine whether the service type requested by the first operation request is allowed;
- verifying whether the application server certificate is within the validity period of the application server certificate; and
- acquiring a state of the application server certificate from a blockchain to verify the state of the application server certificate.

20. The method according to claim 11, wherein verifying the second operation request comprises:
- parsing the second operation request to acquire a security host certificate and a security host signature comprised therein, wherein the security host certificate comprises an identification of the security host, a list of allowed service types of the security host, and a validity period of the security host certificate;
- decrypting the security host signature using a public key of the security host to determine whether the second operation request is signed by the security host; and
- verifying whether the security host certificate is within the validity period of the security host certificate.

21. A non-volatile computer-readable storage medium having machine-executable instructions stored thereon, wherein the machine-executable instructions, when executed by a computer, perform the method according to claim 11.

* * * * *